US010776930B2

(12) United States Patent
Perry

(10) Patent No.: US 10,776,930 B2
(45) Date of Patent: Sep. 15, 2020

(54) MOBILE DEVICE, SYSTEM, AND COMPUTERIZED METHOD FOR TRACKING FLYING OBJECTS AND DISPLAYING TRACKED FLYING OBJECTS ON THE MOBILE DEVICE

(71) Applicant: John W. Perry, Eden Prairie, MN (US)

(72) Inventor: John W. Perry, Eden Prairie, MN (US)

( * ) Notice: Subject to any disclaimer, the term of this patent is extended or adjusted under 35 U.S.C. 154(b) by 236 days.

(21) Appl. No.: 15/970,109

(22) Filed: May 3, 2018

(65) Prior Publication Data

US 2019/0066310 A1 Feb. 28, 2019

Related U.S. Application Data

(60) Provisional application No. 62/502,059, filed on May 5, 2017.

(51) Int. Cl.
*G06F 3/0488* (2013.01)
*G06K 9/00* (2006.01)
*G06T 7/246* (2017.01)
*G06T 7/00* (2017.01)
*G02B 27/01* (2006.01)

(52) U.S. Cl.
CPC ............ *G06T 7/246* (2017.01); *G06F 3/0488* (2013.01); *G06K 9/00* (2013.01); *G06K 9/0063* (2013.01); *G06T 7/97* (2017.01); *G02B 27/017* (2013.01); *G06T 2207/10016* (2013.01); *G06T 2207/30252* (2013.01)

(58) Field of Classification Search
None
See application file for complete search history.

(56) References Cited

U.S. PATENT DOCUMENTS

2016/0214015 A1* 7/2016 Osman .................. A63F 13/213
2018/0061243 A1* 3/2018 Shloosh ............... G08G 5/0043
2018/0196425 A1* 7/2018 Kobayashi ........... G05D 1/0044

* cited by examiner

*Primary Examiner* — Idowu O Osifade
(74) *Attorney, Agent, or Firm* — Greenberg Traurig LLP

(57) ABSTRACT

Devices, systems, and methods for tracking a flying object, and displaying the tracked flying object with additional information regarding the flying object on a display. Digital images from one or more image sensors identify and track flying objects by the velocity and direction of movement, and can convey flight paths, corresponding collision alarms, warnings, or other information on the display.

10 Claims, 6 Drawing Sheets

Horizontal Movement

Diagonal Movement

Perpendicular Movement

Complex/Standard Movement

Complex/Standard Movement

General Movement

MOBILE DEVICE, SYSTEM, AND COMPUTERIZED METHOD FOR TRACKING FLYING OBJECTS AND DISPLAYING TRACKED FLYING OBJECTS ON THE MOBILE DEVICE

FIELD

This description is generally related to a device, system, and a computerized method for tracking movement of objects in flight and displaying the objects and their movement on a display.

BACKGROUND

The movement of flying objects can be very important across a wide range of applications, for example, when flying aircraft under visual flight rules, tracking balls when golfing, alerting one to potential targets when hunting birds, locating drones, etc., which a person generally relies on her eyes to perform.

BRIEF SUMMARY

In an embodiment, a device includes an image sensor, a memory (non-transitory computer readable), a processor, and a display (device, component, etc.), all connected to one another and located within a housing, and wherein the processor analyzes images from the image sensor to identify nonmoving objects, slow-moving objects and fast-moving objects and tracks identified fast-moving objects and the display provides the images from the image sensor with alert boxes overlaid on identified slow and fast-moving objects. In some embodiments, the system may receive user input to determine the nature of alarms or to define areas to exclude from analysis of the images by the processor.

In another embodiment, a system includes one or more image sensors (devices, components, etc.), a memory, a processor and a display, all in communication with one another but optionally positioned at different locations from one another, for example locating the image sensors on the wings of a plane, or in a remote housing, and wherein the processor analyzes images from the image sensor to identify nonmoving objects, slow-moving objects and fast-moving objects and tracks identified fast-moving objects and the display provides the images from the image sensor with alert boxes overlaid on identified slow and fast-moving objects. In some embodiments, the system may receive user input to determine the nature of alarms or to define areas to exclude from analysis of the images by the processor.

A method embodiment for identifying and tracking flying objects and displaying the tracking of movement via a display may include establishing a visual environment, identifying non-moving areas of the visual environment, identifying slow-moving areas and slow-moving objects, providing an initial alert to a user regarding slow-moving objects, identifying fast-moving objects, continuously tracking the fast-moving object and providing a continuous alert to a user regarding fast-moving objects

DETAILED DESCRIPTION

Tracking flying objects is a critical aspect of many tasks, from aviation to hunting to sports such as golf. The human visual system is usually relied upon for such tracking in many of these tasks, but may be limited by both internal factors such as aging and blind spots and external factors such as limits on viewing angles. Digital image capture and processing can supplement the tracking of flying objects and provide real-time highlighting of flying objects to increase awareness of the presence, direction and velocity of flying objects.

Figure 1:
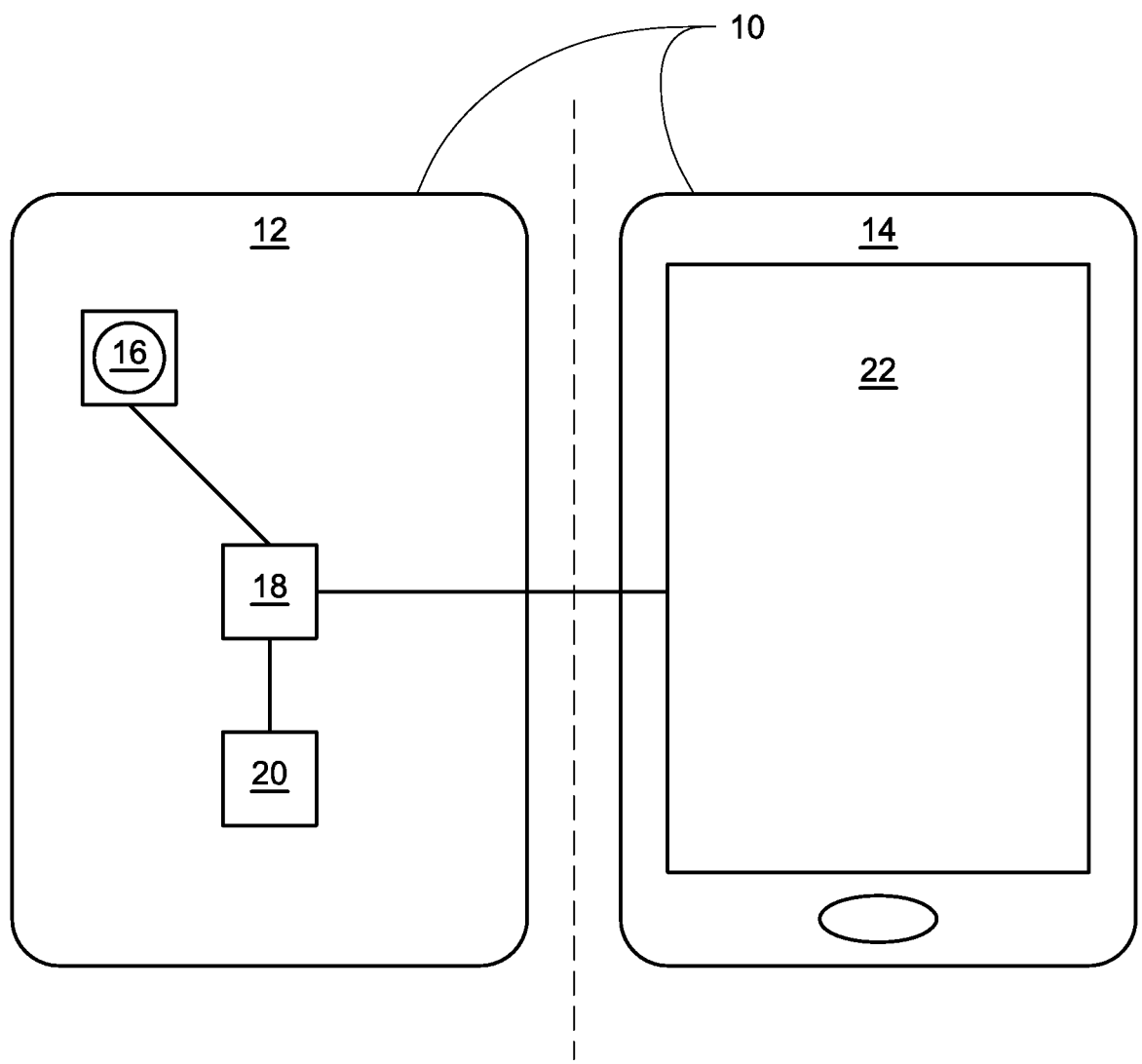
FIG. 1 is a system diagram of an embodiment wherein components are disposed within a housing.

FIG. 1 is a system diagram of an example embodiment. In the system of FIG. 1, the display 22, processor 18, memory 20, and an image sensor 16 are all integrated into a single housing 10. Image sensor 16 may be located on a first side 12 of the housing 10, and a display 22 may be located on a second side 14 of the housing 10. A processor 18 and a memory 20 are located within the housing 10.

The image sensor 16 may be, for example, a digital camera. The image sensor captures a series of images over time. The image sensor 16 may also add additional data to the captured images, such as metadata, for example time-stamps. In some embodiments, the image sensor may be an infrared camera or a thermal imaging sensor. In an embodiment, the image sensor 16 is a digital sensor. In an embodiment, the image sensor 16 includes an image stabilization feature. The frame rate and/or the resolution of the image sensor 16 affects a sensory range of the system. A greater frame rate may increase the sensory range of the system. A greater resolution may increase the sensory range of the system.

The processor 18 may be a microprocessor, such as that included in a device such as a smart phone. The processor is configured to analyze images from the image sensor 16 to identify nonmoving objects, slow-moving objects and fast-moving objects and tracks identified fast-moving objects and the display provides the images from the image sensor with alert boxes overlaid on identified slow and fast-moving objects. In some embodiments, the processor may be additionally configured to crop images or to mark certain areas of images and exclude those areas from analysis. In some embodiments, the processor receives input from a user input device, for example touch-screen input from the display 22 and based on the input, determines areas to crop out or exclude from analysis. In some embodiments, the types of alerts, including audio components and the shape, color, or effects such as flashing of alert boxes on the display 22 may be selected.

Memory 20 is a non-transitory computer readable data storage device. The memory 20 can be, for example, a flash memory, magnetic media, optical media, random access memory, etc. The memory 20 is configured to store images captured by the image sensor 16. In some embodiments, the images captured by the image sensor may include additional data such as time-stamps, or may be modified by the processor, for example cropping the image files or marking zones of the image files as excluded from analysis by the processor 18.

Display 22 may be a display device or component which includes organic light emitting diodes (OLED) or can be a liquid crystal display (LCD). For example the display 22 can be a component of a smart phone or a tablet device. Display 22 receives processed image data from the processor 18 and displays the processed image data. The display 22 may include a user input feature, for example where the display is a touch-screen. The input feature may be used, for example, to define regions of the image to exclude from analysis, or to select options and set parameters for those options such as distance and velocity thresholds for alarms or time windows for performing tracking operations.

Housing 10 may be a metal and/or plastic casing covering the processor and memory, and with at least one image sensor 16 disposed on a first side and the display 22 disposed on a second side. The housing 10, image sensor 16, memory 20 and processor 18 may be, for example, a smart phone.

Figure 2:
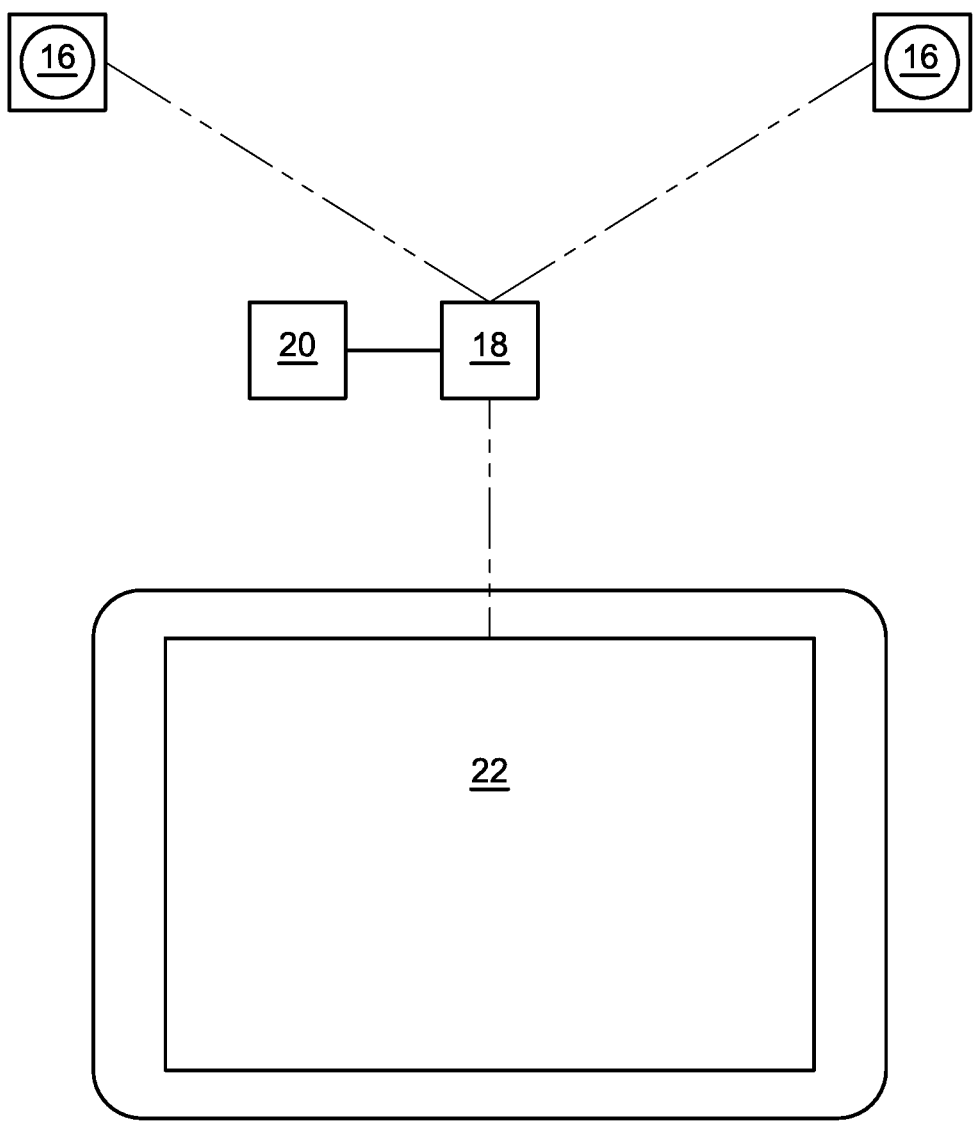
FIG. 2 is a system diagram of an embodiment featuring multiple image sensors and wherein the components are communicatively coupled with one another while located in multiple locations.

FIG. 2 is a system diagram of an example embodiment. In the embodiment of FIG. 2, the system features multiple image sensors 16, a processing unit 18, and a display 22 which are communicatively coupled to one another. The image sensors 16 may be located separately from the processor 18 and the memory 20. The display 22 may, in some embodiments, be located separately from the processor 18 and the memory 20. The communicative coupling of components may be through one or more of wired connections, for example via direct connections or USB, or wireless through methods such as, for example, Bluetooth, ZigBee, or 802.11 wireless networking.

In some embodiments, the image sensor 16 includes a fixed camera. The camera can be mounted on a vehicle (e.g., land vehicle, water vehicle, or air vehicle). For example, the camera can be mounted to a fuselage of an aircraft. For example, the camera can be mounted on an aircraft wing or within an airplane cockpit. In some embodiments, the camera may be portable and located in a housing that may be fixed to another object, such as a static object, for example a tree, or a movable object, for example a helmet. In some embodiments, the multiple image sensors 16 may be part of a single three-dimensional (3-D) camera such as a stereoscopic camera.

In embodiments with a 3-D camera or multiple image sensors, the distance to an object or its approximate size may be determined based on the images from each of the image sensors.

In some embodiments, there may be an additional user input tool, for example a keyboard and/or mouse in communication with the processor, or integrated into components of the embodiment, such as the display 22 having touch-screen functionality. These user input tools may be used for certain options, such as selecting rules for alarms or notifications, defining areas to exclude from analysis, or activating or deactivating the tracking functionality for particular periods of time, for example disabling flight tracking of game birds after sunset or disabling tracking of flying objects in an aeronautics application when conditions depart from visual flight rules (VFR).

Display 22 may be a two-dimensional display screen such as an LCD or OLED display. In some embodiments, display 22 may be a VR device such as a headset, an AR device such as a head-mounted display with a translucent or transparent screen.

Figure 3:
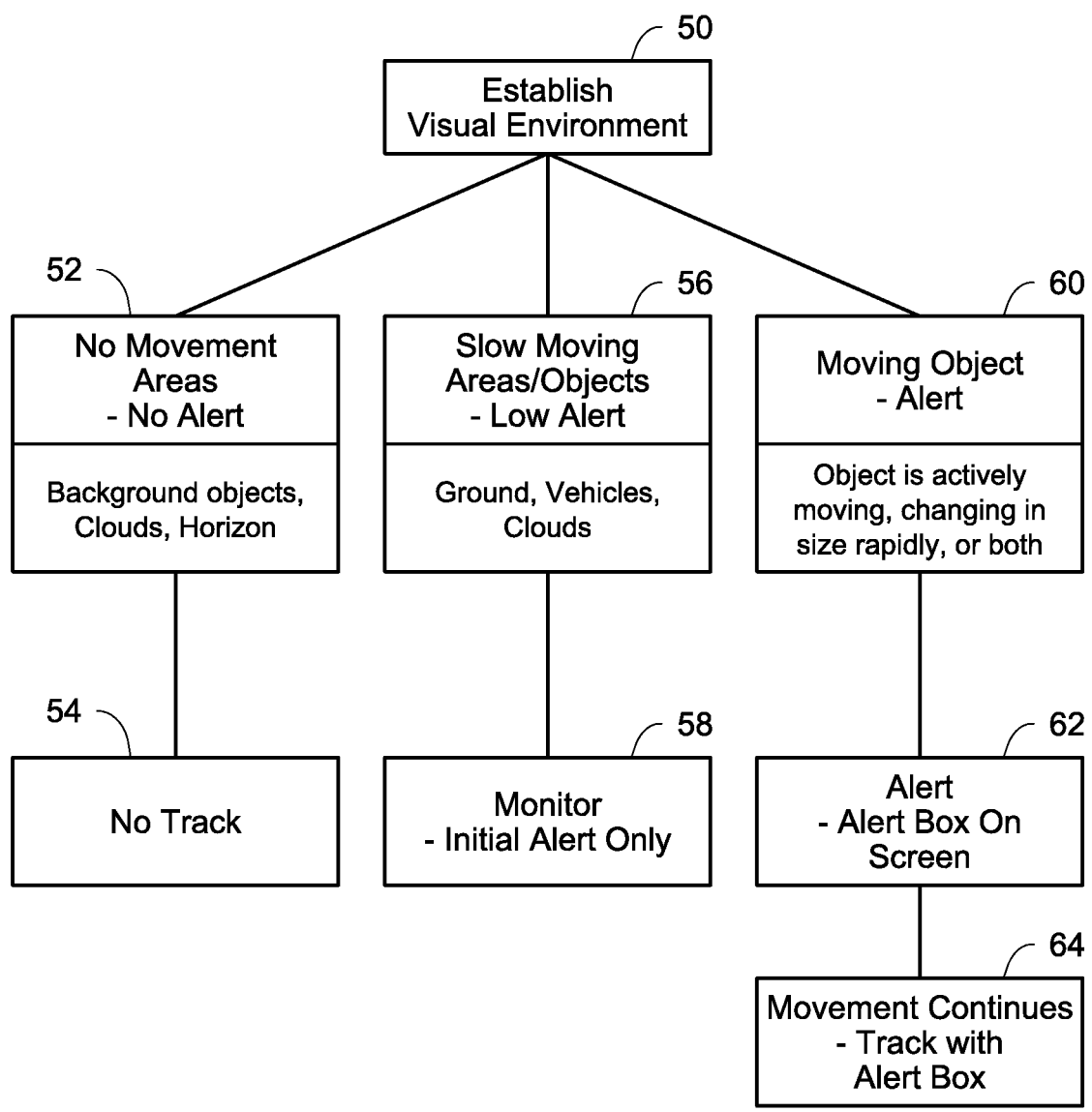
FIG. 3 is a flowchart of a method embodiment.
Figure 4A:
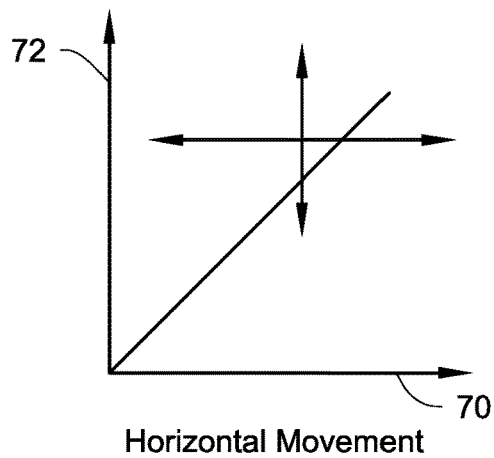
FIGS. 4A-F are diagrams of examples of movement tracked via an embodiment.
Figure 4B:
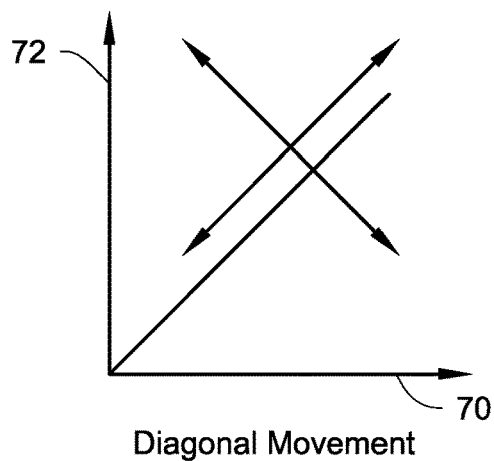
Figure 4C:
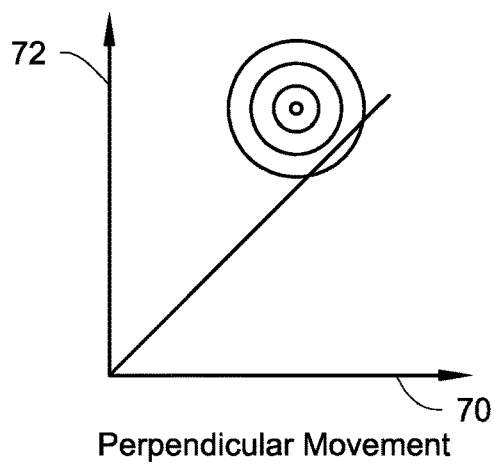
Figure 4D:
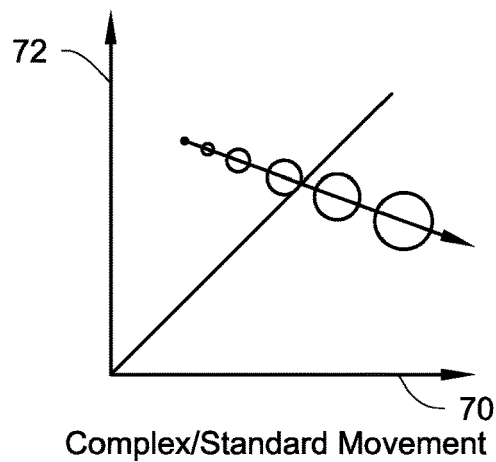
Figure 4E:
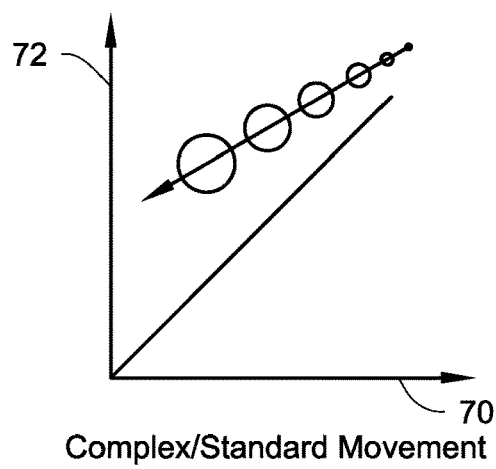
Figure 4F:
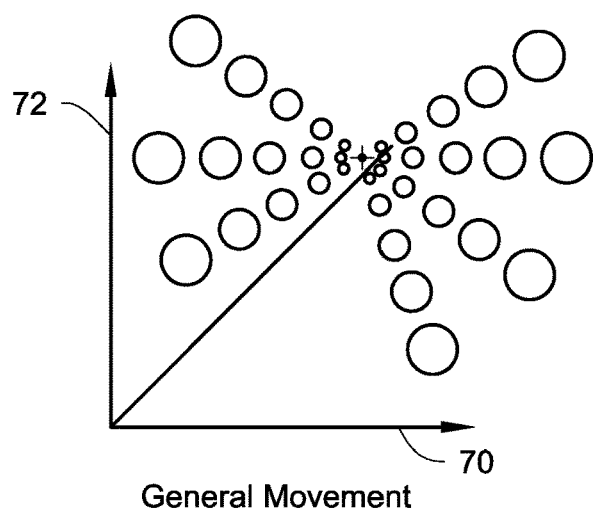

FIG. 3 is a flowchart of a method embodiment. A visual environment is established 50, static or non-moving areas (e.g., no movement areas) are identified 52, but are not tracked 54, slow-moving areas or objects are identified 56, slow-moving areas or objects may be monitored 58, moving objects are identified 60 and an alert is generated 62, an alert box is presented on the display 22, and the moving object is tracked continuously 64.

A visual environment is established in step 50. The visual environment established in step 50 may be the vertical and horizontal area captured by an image sensor, and the resolution of the image sensor. The visual environment may represent the visual range of the image sensor. The visual environment may correspond to the characteristics of images provided to a user via a display, including, for example, the field of view and the resolution of the displayed image.

Static or non-moving areas (e.g., no movement areas) are identified in step 52. Static or non-moving areas may be determined by a lack of change in a portion of the visual environment across multiple frames of the visual environment captured by the image sensor. The aspects of the static or non-moving areas that do not change may include the color, hue, shade or brightness of those areas. Static or non-moving areas may include the ground and fixed features such as, for example, trees when those are not moving relative to the image sensor 16, for example when the image sensors are in a fixed position on the ground during an application such as bird hunting. Static or non-moving areas do not trigger any alerts or tracking 54.

Slow-moving areas or objects are identified in step 56. Slow-moving areas or objects are areas or objects in the visual environment where a rate of change in one or more aspects is greater than zero or a minimum value, but less than that of a fast-moving object. The aspects which may change in a slow-moving area or object may include the color, hue, shade, and/or brightness of that area or object. In an embodiment, a determination is made that an object is slow-moving or fast-moving based on whether one or more threshold values for the rate of change of the aspects of that area or object are satisfied. The size of the area of the visual environment where the aspects are changing may also be used to determine whether an object is slow-moving or fast moving. The threshold values for rate of change and/or the area over which aspects change may, in an embodiment, be one or more predetermined values. The predetermined values may be selected, for example, based on the use case in which this method is applied, for example using one set of threshold values for an embodiment used in piloting aircraft, while an embodiment for use in hunting has a different set of predetermined threshold values. In an embodiment, the threshold value is selected (set by) a user via a user interface (e.g., a graphical user interface displayed on a display). These slow-moving areas may include large slow-moving areas or objects, such as in flight examples, ground features or clouds. These objects may, in some embodiments, be user defined, for example through selection of regions via a user interface such as a touch screen. For objects, there may be an initial alert such as a presentation of a box around the object. The initial alert for a slow-moving object may be such that it conveys a lower priority than alerts for fast-moving objects, for example using yellow or green alert symbols as opposed to red alert symbols. For areas which are likely to be, for example, ground features or clouds, there may not be an alert for the slow-moving object.

Slow-moving objects may be monitored in step 58. When monitored, objects or areas corresponding to the slow-moving object are identified and in some embodiments, a tracking symbol such as an alert box may be displayed over the slow-moving object.

Fast-moving objects are identified in step 60 and an alert is generated in step 62. Fast-moving objects may be identified through the process used in step 56, with the fast-moving objects being those satisfying the threshold values for rate of change and/or area of change of aspects of the object. The alert generated in 62 may be a visual alert such as a flash or a colored box surrounding the fast-moving objects, an audio alert such as a tone or recorded voice warning, or a combination of both visual and audio alerts. The alert may be selected, for example from a range of alerts having different visual or audio components based on the behavior of the fast-moving object, such as the velocity of the object, its direction of travel such as whether it is approaching or moving away from the image sensor, and in some embodiments such as those with stereoscopic cameras, estimates of object size and distance. The selection of the alert may also be based on whether the fast-moving object was previously identified and is being tracked in accordance with step 64, or whether this is the first instance of detection of the fast-moving object.

An alert box is presented on the display in step 62. The alert box is presented on the display 22 in a position where the box surrounds the fast-moving object. The alert box may be one or more shapes including squares, rectangles, circles, diamonds or other regular shapes which may be used to surround and highlight the object determined to be a fast-moving object. The size, shape, and color of the alert box may be based on the proximity of the object, its velocity, its direction of apparent travel, and rules for prioritizing objects. For example, fast-moving objects which are decreasing in size and moving away from the camera may be shown in a different size, shape, color or other features such as flashing than objects which are increasing in size and approaching the camera. In some examples, the highest priority object alert boxes may include visual features such as flashing. In some embodiments, color used for the alert box may be used to represent the priority of an object, for example green may represent slow-moving objects moving away from the image sensor or image sensors 16, yellow may represent fast-moving objects moving away from the image sensor or sensors 16 and slow-moving objects moving towards the image sensor or sensors 16, and red may be used for fast-moving objects Fast-moving objects are tracked continuously 64. As each image is processed, the object corresponding to each fast-moving object identified previously is identified and the position and size of the alert box updated for presentation on the display 22.

In some embodiments, user input may be used to define regions which are excluded from the analysis. Excluded regions may include, for example, areas unlikely to contain an object of interest, for example the ground for an embodiment used under VFR, areas with an excess of distractors, or areas which are not useful to the user, for example, areas within the field of view of the image sensor 16 where a flock of game birds would be unsafe to shoot at. The user input for defining the region may be interaction with a display or user interface showing the view of the image sensor 16, with the input being a touch-screen input such as drawing a region to exclude or using two or more fingers to define the region to be excluded, or selection using a cursor such as one controlled by a mouse, track-pad, joy-stick or other such control interfacing with the processor and the display. The excluded regions may be removed from the portions of the image which are analyzed, may be treated as non-moving or static areas (e.g., no movement areas) identified in step 52 of method embodiments, or may be treated as large slow-moving objects identified in step 56 of method embodiments. For example, the excluded regions may be cropped out of the image sensor 16 images prior to their processing in establishing the visual environment 50.

FIG. 4 is a set of images depicting types of movement which may be detected and tracked by an embodiment. In FIG. 4, the axes of movement of detected objects are all relative to the image captured by the image sensor or sensors 16. In these embodiments, the x-axis 70 is horizontal with respect to the orientation of the image sensor or sensors 16, the y-axis 72 is vertical with respect to the orientation and position of the image sensor or sensors 16, and the z-axis is the distance between the image sensor 16 and the tracked object. FIG. 4A shows movement along one axis, where the object is moving along one of the x-axis 70 or the y-axis 72. FIG. 4B shows two-axis movement, where the flying object moves in both the x-axis 70 and the y-axis 72, but still is at a constant distance in the z-axis. FIG. 4C shows movement only in the z-axis, wherein the apparent size of the object relative to the rest of the image sensor's field of view grows or shrinks. FIGS. 4D, 4E and 4F show examples combining the movement of FIGS. 4A, 4B and 4C. In FIG. 4D, the object is approaching the viewer in the z-axis, represented by the increase in size in the direction of travel represented by the arrow, while it moves to the right along the x-axis 70 and down along the y-axis 72. In FIG. 4E, the object is again moving down along the y-axis 72 while it moves to the left along the x-axis 70, and towards the observer in the z-axis. In FIG. 4F, there are multiple objects moving in each direction with respect to each of the x-axis 70, the y-axis 72 and the z-axis.

Figure 5:
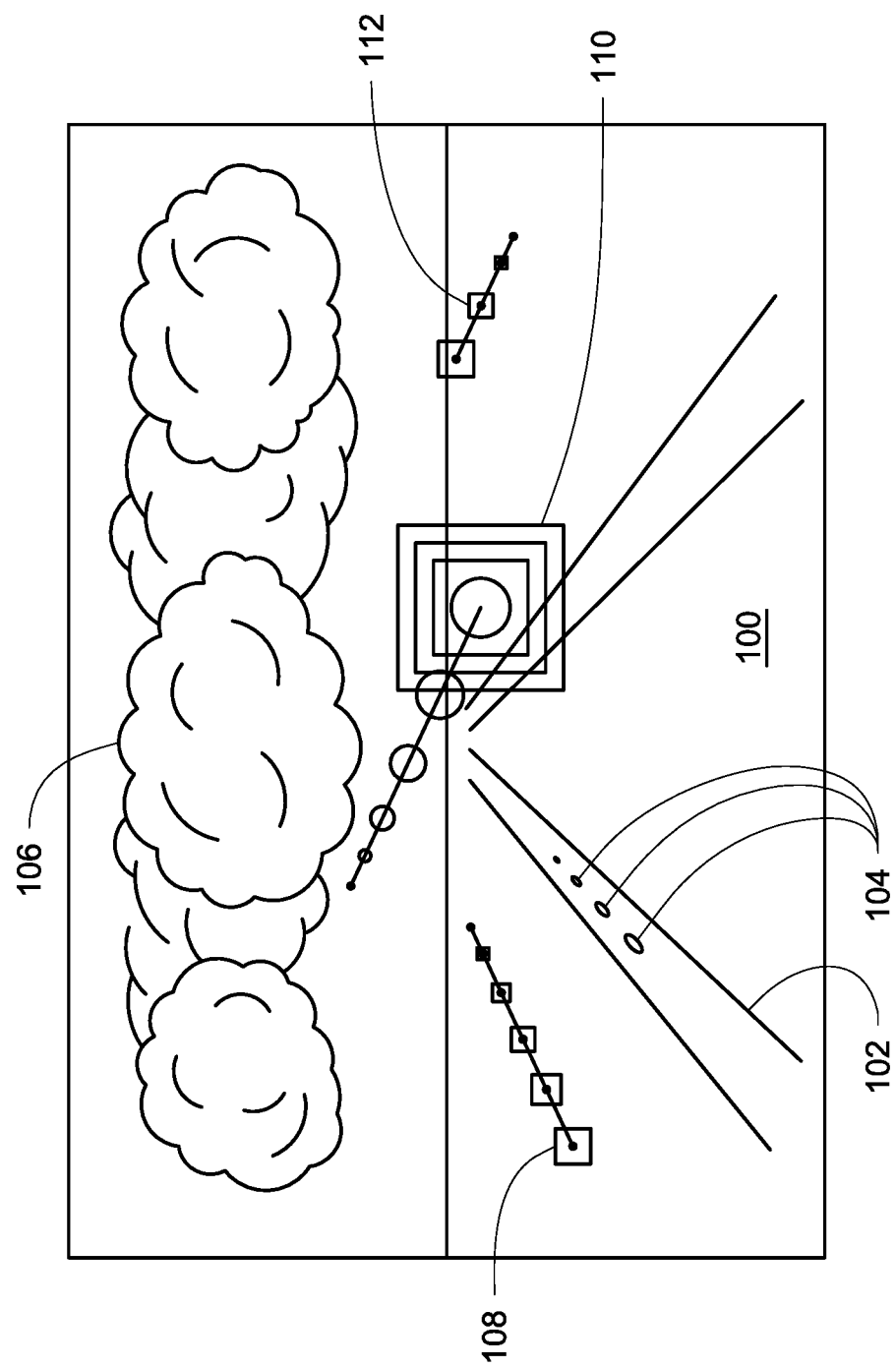
FIG. 5 is an example of a display of an embodiment tracking multiple moving objects.

FIG. 5 presents an example view of a display when an embodiment is in use during flying operations. Ground 100 is viewable, with no highlights on features on the ground, such as cars 104 on road 102. The relatively low speed of movement of cars 104 relative to the background on the ground 100 are such that the cars 104 are not identified as an object that must be tracked on the display, categorized as small slow-moving objects in step 58. A first flying object 108 is moving towards the image sensor or sensors 16. The path of movement of the first flying object 108 is highlighted with a series of boxes representing its position over recent increments of time, increasing in size as the object draws closer and adding a border around the highlighting square at the latest position. First flying object 108, second flying object 110 and third flying object 112 are identified as fast-moving objects in step 60. First flying object 108 is moving in a path where it is between the image sensor 16 and the ground 100, showing detection and highlighting of objects moving against the slowly moving background of the ground 100. Cloud 106 appears in the image presented on the display, without highlighting, as with the ground 100. Movement of features of the cloud 106 is not tracked and highlighted on the display 22, since the cloud is tracked as a large slow-moving object in step 56 and optionally may be selected for a user for exclusion. Second flying object 110 is moving towards the image sensor 16 and is close enough and moving rapidly enough to trigger additional highlighting 64. In some embodiments, the location and movement of the second flying object 110 may trigger an alarm or an alert. In some embodiments, the highlighting and optional alert or alarm may be based on the direction of movement relative to the image sensor 16 as well as the distance and/or velocity of the object, for example when the lack of movement in the x-axis and y-axis, combined with approaching the image sensor 16 in the z-axis indicates a collision course. The tracking of the second flying object 110 also shows tracking objects as they cross the horizon, from the sky as background, in this example, cloud 106, to the ground 100 as background. Third flying object 112 is also highlighted on display 22, and is traveling away from the viewer as the highlighting around the object shrinks along its path of recent positions.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A device for tracking objects, comprising:
    a housing including a first side and a second side, the housing comprising:
        an image sensor located on the first side of the housing;
        a display located on the second side of the housing;
        a non-transitory computer readable memory located within the housing and configured to store image data and alert classification rules;
        a processor located within the housing and connected to the image sensor, the non-transitory computer readable memory, and the display, that:
            receives image data;
            analyzes image data to identify one or more fast-moving objects;
            associates an alert box with each of the fast-moving objects based on the alert classification rules; and
            directs the display to display the image data and the alert box.

2. The device of claim 1, wherein the housing is a smart phone.

3. The device of claim 1, further comprising a user input device, wherein the user input device is a touch-screen interface with the display.

4. The device of claim 3, wherein the processor analyzing image data does not analyze portions of the image data associated with regions selected using the user input device.

5. The device of claim 1, wherein the alert classification rules are based on the direction and velocity of movement of the fast-moving objects.

6. The device of claim 1, further comprising a speaker connected to the processor and wherein the processor further:
    associates an alert tone with the one or more fast-moving objects; and
    directs the speaker to play the associated alert tone.

7. A method for automatic tracking of flying objects, comprising:
    receiving image data from a device for tracking objects, the device including a housing including a first side and a second side, the housing including an image sensor located on the first side of the housing and a display located on the second side of the housing, a non-transitory computer readable memory located with the housing and configured to store image data and alert classification rules, and a processor located within the housing and connected to the image sensor, the non-transitory computer readable memory, and the display;
    analyzing, by the processor, the image data to identify one or more fast-moving objects;
    associating, by the processor, an alert box with each of the fast-moving objects based on the alert classification rules; and
    directing the device to display the image data and the alert box.

8. The method of claim 7, further comprising tracking the one or more fast-moving objects.

9. The method of claim 7, further comprising:
    analyzing the image data to identify one or more slow-moving objects; and
    tracking the one or more slow-moving objects.

10. The method of claim 7, further comprising:
    associating an alert tone with the one or more fast-moving objects;
    playing the alert tone through a speaker.

* * * * *